Jan. 14, 1964  H. SCHNEIDER  3,118,093
DRY RECTIFIER OF SMALL TYPE
Filed July 12, 1960
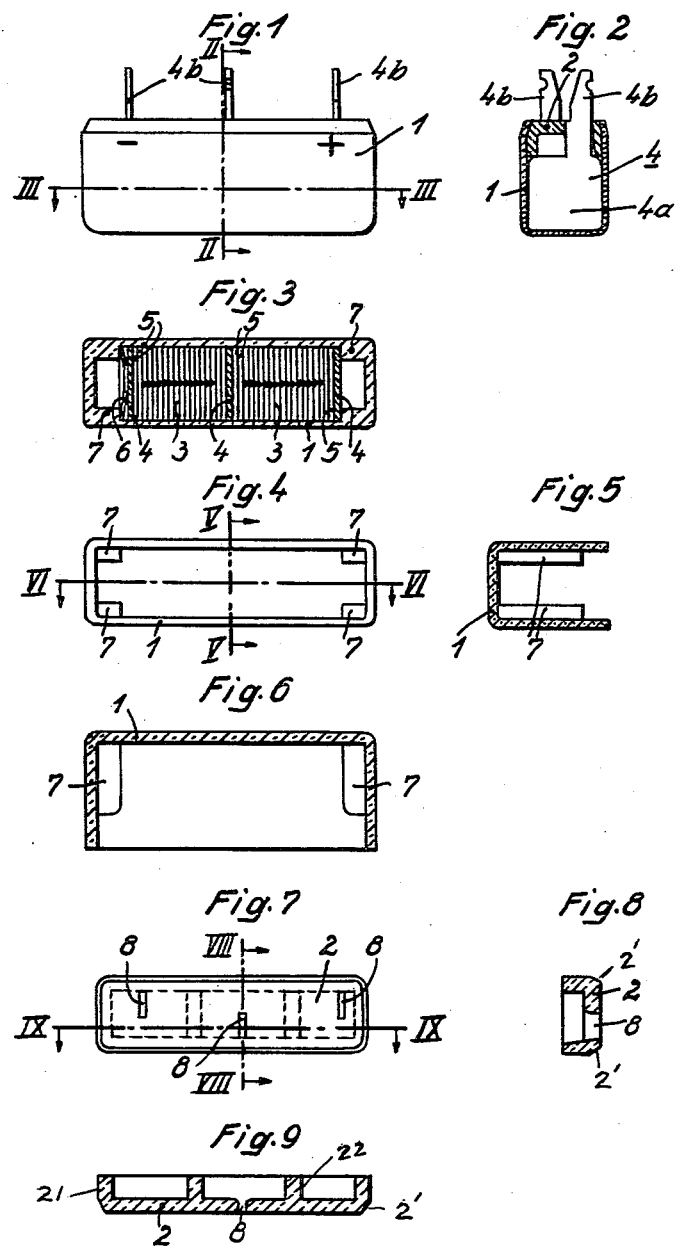
Inventor:

United States Patent Office 3,118,093
Patented Jan. 14, 1964

3,118,093
DRY RECTIFIER OF SMALL TYPE
Heinz Schneider, Berlin-Haselhorst, Germany, assignor to Siemens-Schuckertwerke Aktiengesellschaft, Erlangen, Germany, a German corporation
Filed July 12, 1960, Ser. No. 42,384
Claims priority, application Germany July 22, 1959
3 Claims. (Cl. 317—234)

My invention relates to a dry rectifier of small or midget type in which a stack of imperforate rectifier elements, formed of small plates or tablets, is enclosed in an electrically insulative housing of thermoplastic synthetic material.

An object of my invention is to simplify the design and assembly of such rectifiers, and also to improve and simplify the means and expedients employed for passing connecting lugs or flags laterally from the rectifier stack through the housing wall to the outside.

According to my invention, a stack of substantially rectangular or square tablets together with the connecting electrode members is introduced into a box-shaped housing of generally prismatic shape, with the stack axis extending parallel to the flat bottom of the housing. The housing is then closed by a cover which is preferably completely sunken into the opening of the housing and has upwardly and inwardly bevelled edges engaged by correspondingly bevelled housing marginal portions of the housing, the cover being provided with openings through which the connecting lugs or flags pass to the outside.

The provision of a sunken cover with bevelled upper edges is highly advantageous in that it facilitates the closing and permanent sealing of the housing in a very simple fashion, namely by heating and bending the housing edges. Furthermore the assembly work needed for producing such a rectifier is extremely simple. This will be made evident by the following description of a preferred embodiment of a rectifier constructed according to the invention and illustrated, by way of example, on the accompanying drawing, in which:

FIG. 1 is a lateral view, of the rectifier fully assembled.

FIG. 2 is a cross section taken along the line II—II of FIG. 1.

FIG. 3 is a longitudinal section taken along the line III—III of FIG. 1.

FIG. 4 is a top view of the housing with the cover and rectifier stack removed.

FIG. 5 is a cross section along the line V—V of FIG. 4.

FIG. 6 is a longitudinal section along the line VI—VI of FIG. 4.

FIG. 7 illustrates the cover separately, in a top view.

FIG. 8 is a cross section along line VIII—VIII of FIG. 7, and

FIG. 9 is a longitudinal section along line IX—IX of FIG. 7.

As is apparent from FIGS. 1 to 3, the illustrated dry rectifier comprises a housing formed of a box-shaped container 1 of generally prismatic shape and a cover 2 which is sunk into the container, preferably so that the top of the cover lies flush with the top edges of the container. Both parts of the housing consist of thermoplastic synthetic material, for example polystyrol. Mounted in the housing is a stack comprising a number of substantially rectangular or square selenium rectifier tablets 3, connecting sheets 4 of copper, and if desired, blind plates or metallic filler pieces 5. Also provided in the stack is a spring member 6 (FIG. 3) to secure the necessary contact pressure. In the illustrated embodiment the spring member is a leaf spring. Each of the connecting plates 4, the shape of which is particularly apparent from FIG. 2, comprises a rectangular or square main portion 4a which forms part of the stack, and a connecting or terminal flag 4b which passes through the cover 2 to the outside of the housing.

The housing 1, more fully apparent from the component parts illustrated in FIGS. 4 to 6, is essentially a prismatic container, box or cup molded of thermoplastic material, and having integral molded inner projections 7 which form supports for the cover 2 at the four corners.

The cover 2 is provided with three slots 8 for the passage of the connecting flag 4b. The edges of the cover, as best apparent from FIGS. 8 and 9, are bevelled at 2', the angle of the bevelled portion being approximately 30°. The cover is molded in cup shape, to provide a peripheral rim 21 (FIG. 9) and strengthening flanges 22.

When assembling the rectifier, the stack, comprised of the elements 3, 4, 5 and 6, is first assembled in a jig and is then introduced into the box-shaped container 1. The cover 2 is inserted into the upper, and still open, portion of the container 1 at a time when the edges of the container are still straight, as shown in FIGS. 5 and 6. Thereafter the housing is closed and sealed by heating the edges of the container 1 and forcing them against the bevelled edges of the cover 2, so that the final condition illustrated in FIGS. 1 and 2 will result. The heating heat seals together the edges of the thermoplastic container and cover.

It will be recognized from the foregoing that the assembling of a rectifier according to the invention is an extremely simple matter, the resulting device containing all of its component parts securely held together and reliably closed from the outside.

I claim:

1. A dry rectifier of small type comprising a stack of imperforate rectifier elements, an electrically insulative housing enclosing said stack, the stack comprising rectangular rectifier tablets and also connecting members provided with connecting lugs, the housing having a generally rectangular inner transverse cross section and comprising a box-like container having an open top and a cover for said top, the container being formed of electrically insulative thermoplastic material and having integral inner support portions at its corners, the stack being disposed in the housing with the stack axis extending parallel to the inner container bottom, the covers being substantially sunken into the container and resting on said support portions, the upper edges of the cover being provided with upwardly and inwardly bevelled surfaces, the cover having openings through which the connecting lugs of the connecting members pass to the outside, the edges of the box-like container engaging the bevelled edges of the cover, said connecting lugs passing through said cover and being sealed therein.

2. A dry rectifier of small type comprising a stack of rectifier elements, an electrically insulative housing enclosing said stack, the stack comprising rectangular rectifier tablets and also connecting members provided with connecting lugs, the housing having a generally rectangular inner transverse cross section and comprising a box-like container having an open top and a cover for said top, the container and cover being formed of electrically insulative thermoplastic material, the container having integral inner support portions at its corners, the stack being disposed in the housing with the stack axis extending parallel to the inner container bottom, the cover being at least partly sunken into the container, the cover resting on said support portions, the upper edges of the cover being provided with upwardly and inwardly bevelled surfaces, the cover having openings through which the connecting lugs of the connecting members pass to the outside, the edges of the box-like container being bent over and being in heat welded engagement with the bevelled edges of the cover.

3. A dry rectifier comprising a stack of rectifier elements, a housing enclosing said stack, the stack comprising rectangular rectifier tablets and also connecting members provided with connecting lugs, the housing having a generally rectangular inner transverse cross section and comprising a box-like container having an open top and a cover for said top, the container and cover being formed of electrically insulative thermoplastic material, the container having integral inner support portions, the stack being disposed in the housing with the stack axis extending parallel to the inner container bottom, the cover being sunken into the container and resting on said support portions, the upper edges of the cover being provided with upwardly and inwardly bevelled surfaces, the cover having openings through which the connecting lugs of the connecting members pass to the outside, the top surface of the cover being substantially flush with the top edge of the container, the edges of the box-like container engaging the bevelled edges of the cover, and being welded thereto.

References Cited in the file of this patent
UNITED STATES PATENTS

| | | |
|---|---|---|
| 2,788,474 | Jackson | Apr. 9, 1957 |
| 2,799,815 | Lockett | July 16, 1957 |
| 2,802,158 | Walker et al. | Aug. 6, 1957 |
| 2,829,320 | Dimond | Apr. 1, 1958 |
| 2,896,135 | Briggs | July 21, 1959 |